(12) United States Patent
Xiang et al.

(10) Patent No.: US 8,645,400 B1
(45) Date of Patent: Feb. 4, 2014

(54) FLEXIBLE BIT FIELD SEARCH METHOD

(75) Inventors: Shuhua Xiang, Fremont, CA (US);
Venkata Narayana Pinnamaraju Durga, Cupertino, CA (US)

(73) Assignee: Marvell International Ltd. (BM)

( * ) Notice: Subject to any disclaimer, the term of this patent is extended or adjusted under 35 U.S.C. 154(b) by 992 days.

(21) Appl. No.: 12/512,902

(22) Filed: Jul. 30, 2009

Related U.S. Application Data

(60) Provisional application No. 61/085,498, filed on Aug. 1, 2008.

(51) Int. Cl.
*G06F 7/00* (2006.01)

(52) U.S. Cl.
USPC ............................................. 707/754

(58) Field of Classification Search
USPC .............. 707/712, 745, 754, 999.006
See application file for complete search history.

(56) References Cited

U.S. PATENT DOCUMENTS

| | | | | |
|---|---|---|---|---|
| 5,570,370 A * | 10/1996 | Lin | ................................ | 370/347 |
| 5,727,036 A * | 3/1998 | Maertens | ...................... | 375/369 |
| 5,995,149 A * | 11/1999 | Saunders et al. | ......... | 375/240.18 |
| 6,615,210 B1 * | 9/2003 | Huang et al. | ........................ | 1/1 |
| 6,819,224 B2 * | 11/2004 | Brierley | ..................... | 340/146.2 |
| 7,593,620 B2 * | 9/2009 | Surcouf et al. | ................ | 386/343 |
| 7,640,487 B2 * | 12/2009 | Amielh-Caprioglio et al. | ............................. | 715/203 |
| 2002/0057889 A1 * | 5/2002 | Ando et al. | ....................... | 386/1 |
| 2003/0123456 A1 * | 7/2003 | Denz et al. | ..................... | 370/400 |
| 2008/0240093 A1 * | 10/2008 | Morad et al. | .................. | 370/389 |
| 2009/0262867 A1 * | 10/2009 | Wan et al. | ..................... | 375/340 |
| 2010/0008430 A1 * | 1/2010 | Karczewicz et al. | .... | 375/240.25 |
| 2011/0022401 A1 * | 1/2011 | Pang et al. | .................... | 704/500 |

* cited by examiner

*Primary Examiner* — Mohammed R Uddin

(57) ABSTRACT

A method and apparatus uses a section filter to perform a filtering operation, such as a match, do not match, within range, or without range filtering operation, on bitstream data in accordance with a rule. The filtering operation may begin at any bit location in the bitstream data and end at any location in the bitstream data. The result of the filtering operation is compared to a value determined by the rule, or if further rules are to be employed, the result is transmitted to a further section filter which performs a further filtering operation on the bitstream data. As many section filters may be linked in this way as the number of rules to be employed. When the section filter corresponding to the last rule to be employed has performed its filtering operation, all results are compared to values determined by the rules employed to determine which data to extract from the bitstream data.

18 Claims, 4 Drawing Sheets

FLEXIBLE BIT FIELD SEARCH METHOD

CROSS-REFERENCE TO RELATED APPLICATIONS

This application claims the benefit of priority to previously filed U.S. provisional patent application Ser. No. 61/085,498, filed Aug. 1, 2008, entitled "FLEXIBLE BIT FIELD SEARCH METHOD." That provisional application is hereby incorporated by reference in its entirety.

FIELD

Aspects of the present invention relate generally to data filtering, and more particularly to an apparatus and method of searching a flexible number of bit fields within a bitstream and comparing the result to a flexible number of rules.

DESCRIPTION OF THE RELATED ART

A hardware engine may be used to filter a bitstream in order to extract data desired by an application. A section is a block of data, which may for example be audio or video data. A section may consist of 4096 bytes. Each section may be divided into transfer packets, which may each consist of 188 bytes, in order to be transmitted in a data transport stream. Each section begins with a header, which may consist of a maximum of 16 bytes, or 128 bits. In such a system, many sections are transmitted in the transport stream, but the user will only desire to capture certain sections. The standard of the application being used will determine what sections are desired. A section filter is a hardware block that follows section filter descriptor rules stored in memory to filter a section to extract the data desired by the application.

In known hardware implementations, a section filter is divided into 16 bytes, or 128 bits. The known section filter can perform two types of section filtering. In the first type, the section header is filtered by determining a match or no match based on each byte, where a match may yield a result of one and a no match may yield a result of zero, and then adding the results for each of the 16 bytes to yield the total result. In the second type, the section header is filtered by specifying a positive mask or negative mask that determines the desired bit value, determining a match or no match based on each byte by applying the mask, where a match may yield a result of one and a no match may yield a result of zero, and then adding the results for each of the 16 bytes to yield the total result. A mask specifies which bits should be matched. When a positive mask is applied, those specified bits with a value of one are matched. When a negative mask is applied, those specified bits with a value of zero are matched. In both of the foregoing types of filtering strategies, the total result determines whether the section is matched or not matched with the requirements of the application standard. If it is matched, the data is extracted.

Known hardware implementations were originally designed for computer disk applications. However, modern applications require greater flexibility. For example, a digital television receiver may look for particular patterns in the transmission stream to identify what programs are available, or which programs are audio and which are video.

One disadvantage of known hardware implementations is that the section filter looks for a particular pattern of 16 bytes, and checks for matches byte by byte. This means that for each byte, the section filter must begin filtering at the beginning of the byte and end filtering at the end of the byte. Thus, the section filter is limited by a byte boundary. However, the data desired by the application may not start at the beginning of a byte, or it may span more than one byte, or it may span more than one packet. Another disadvantage of known hardware implementations is that if the desired pattern is within a range of values, the section must be filtered multiple times to check each value within the range. For example, if byte number one can equal 10-15, the section must be filtered six times. To accomplish this multiple section filtering, a second entity, such as a central processing unit, must run the entire process again. Another disadvantage of known hardware implementations is that if applying multiple section filter descriptor rules is desired, the section must be filtered multiple times because the entire process must be run for each section filter descriptor.

It would be desirable to provide an approach which is sufficiently flexible to accommodate changes over a sufficiently long period of time while particular hardware engines are in use for filtering data transport streams.

SUMMARY

Embodiments of the present invention overcome the above-mentioned and various other shortcomings of conventional technology, providing a method and apparatus for using a flexible bit field search method to search a flexible number of bit fields within a bitstream and compare the result to a flexible number of rules. Embodiments of the present invention include a section filter that performs a filtering operation, such as a match, do not match, within range, or without range filtering operation, on bitstream data in accordance with a rule. The filtering operation may begin at any bit location in the bitstream data and end at any location in the bitstream data. The result of the filtering operation is compared to a value determined by the rule, or if further rules are to be employed, the result is transmitted to a further section filter which performs a further filtering operation on the bitstream data. As many section filters may be linked in this way as the number of rules to be employed. When the section filter corresponding to the last rule to be employed has performed its filtering operation, all results are compared to values determined by the rules employed to determine which data to extract from the bitstream data. The foregoing and other aspects of various embodiments of the present invention will be apparent through examination of the following detailed description thereof in conjunction with the accompanying drawing figures.

DETAILED DESCRIPTION

Figure 1:
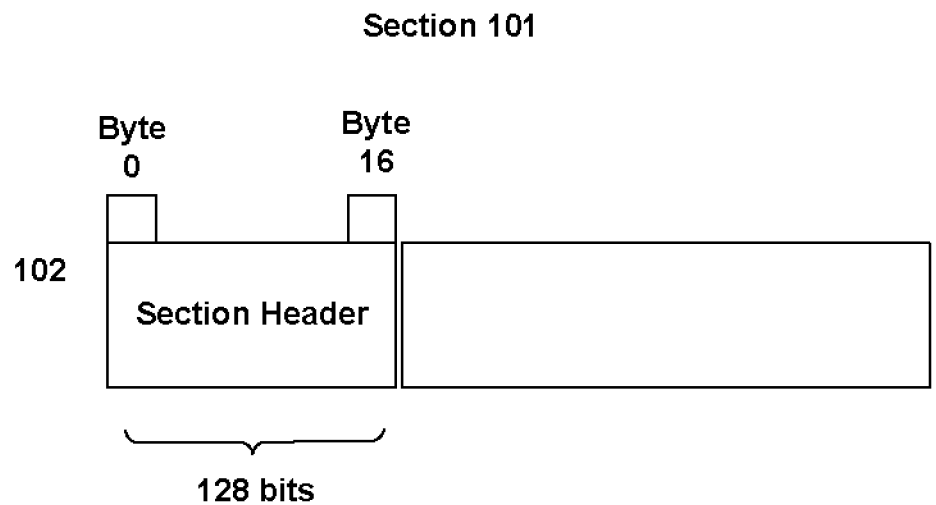
FIG. 1 illustrates a simplified example of a section of data.
Figure 2:
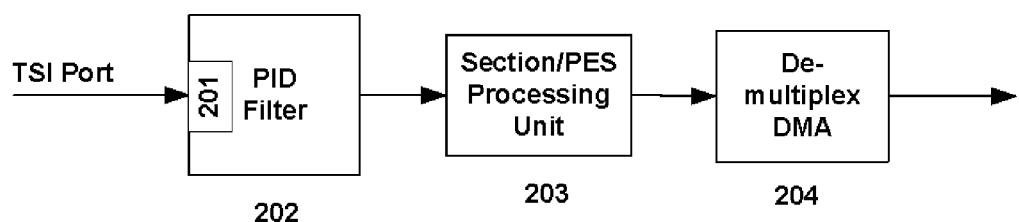
FIG. 2 illustrates a simplified flow chart showing the path of data processed by a current implementation.

FIG. 1 illustrates a simplified example of a data section 101, which may consist of 4096 bytes, containing a section header 102, which may consist of 16 bytes or 128 bits. FIG. 2 illustrates a simplified flow chart showing the path of data processed by a current implementation. Data comprising sections divided into packets of 188 bytes is read from TSI (transport stream input) port 201 into PID (packet identifier) filter 202. Each packet has one unique PID generated by the application associated with it, which PID filter 202 uses to filter the packets desired by the application standard. These packets are read into Section/PES (packetized elemental stream) Processing Unit 203. Some packets contain section data, and these packets are processed by the section filter contained in Section/PES Processing Unit 203. Other packets contain a PES, where the elemental stream may consist of any multimedia content, and these packets are processed separately. The filtered section data and any PES data are read into Demultiplex DMA (direct memory access) 204, which can write the data out to various locations.

In accordance with an embodiment of the present invention, the method and apparatus for a flexible bit field search method may comprise a section filter that can begin filtering section header 102 at any bit in its 128 bit field, and end filtering section header 102 at any bit in its 128 bit field. Thus, the section filtering is no longer limited by a byte boundary. Section filters may also be linked together, providing for flexibility in filtering and extracting the data. For example, the section filter can perform range filtering on section headers based on each byte, by determining whether each byte is within or without of a range specified by the application. Range filtering is accomplished using only one run of the entire process by linking two section filters, one for the range within and one for the range without, and thus multiple runs of the entire process equal to the size of the range are no longer needed. The section filter can also filter the section header based on multiple section filter descriptor rules specified by the application, because multiple section filters can be linked together. Thus, multiple runs of the entire process are no longer needed in order to filter based on multiple section filter descriptor rules.

Figure 3:
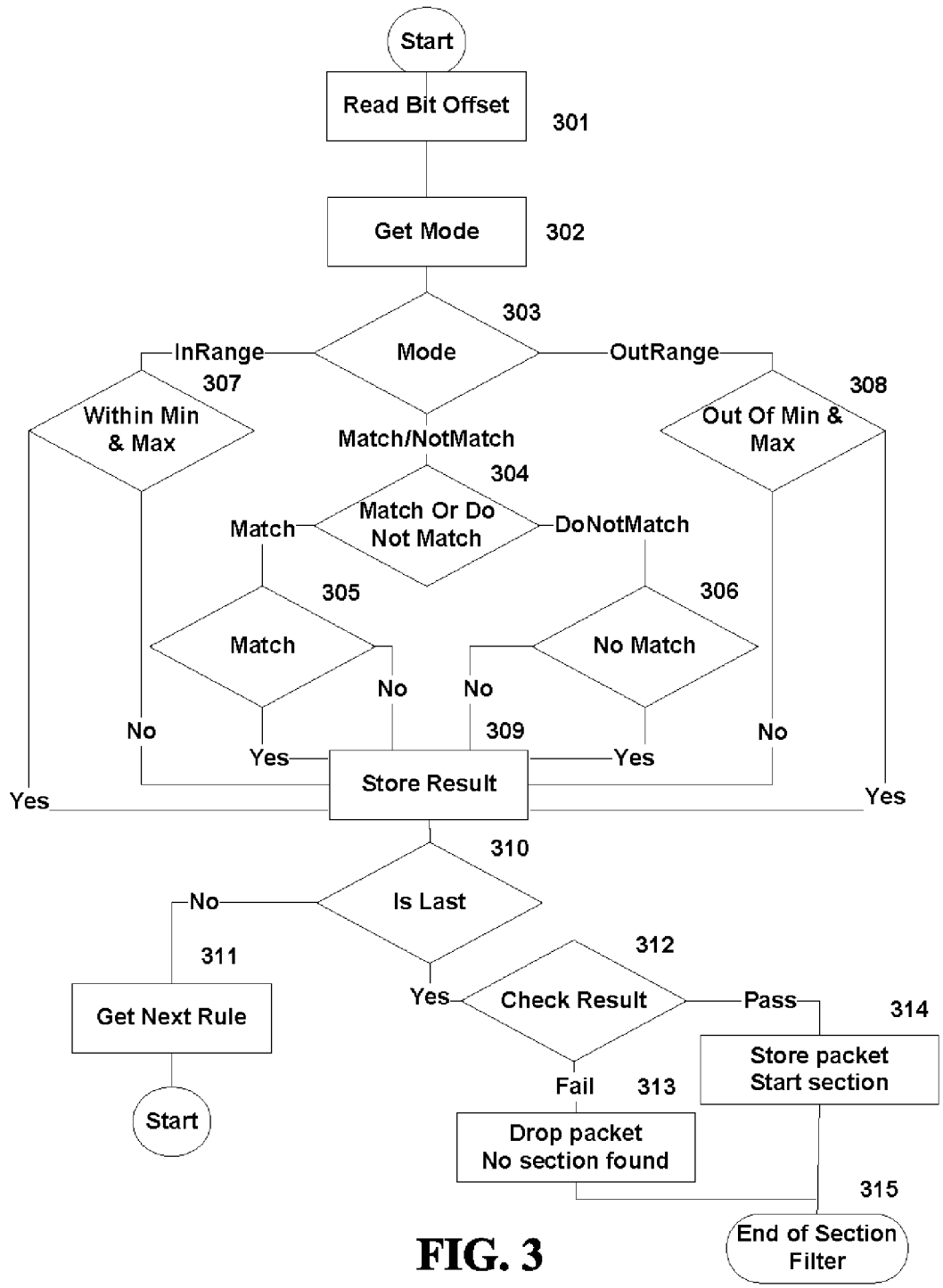
FIG. 3 illustrates a simplified flow chart showing the steps performed by a section filter used in one embodiment of the present invention.

FIG. 3 illustrates a simplified flow chart showing the steps performed by a section filter used in one embodiment of the present invention. At block 301, the section filter reads the bit offset, which instructs the section filter to start at a given bit and end at a given bit in the section header, as desired by the application. At block 302, the section filter receives instructions regarding which mode 303 to employ. The mode 303 may be InRange, OutRange, or Match/NotMatch, for example. The InRange mode is used to determine whether the result of the filtering operations performed on the section header is within a designated minimum and maximum range of values. The OutRange mode is used to determine whether the result of the filtering operations performed on the section header is outside of a designated minimum and maximum range of values. The Match/NotMatch mode is used to determine whether the result of the filtering operations performed on the section header matches a designated value. If the mode 303 is Match/NotMatch, at block 304 the section filter determines whether to apply Match or Do Not Match, and checks each bit accordingly at blocks 305 or 306, where a match may yield a value of one and a no match may yield a value of zero, and these values are added to yield the result, which is stored in block 309. If the mode 303 is InRange, the section filter checks each bit accordingly at block 307, where a match may yield a value of one and a no match may yield a value of zero, and these values are added to yield the result, which is stored in block 309. If the mode 303 is OutRange, the section filter checks each bit accordingly at block 308, where a match may yield a value of one and a no match may yield a value of zero, and these values are added to yield the result, which is stored in block 309. In some implementations, each result may later be checked or compared against a value set by the application.

Because the section header can be filtered by using multiple section filter descriptor rules, as specified by the application, it may be necessary in some circumstances to determine whether a final rule has been employed or if additional rules remain to be employed. Block 310 tells the section filter whether the final rule has been employed, or if there are additional rules to be employed. If block 310 tells the section filter that the final rule has been employed, the result stored in block 309 is checked in block 312 against the value set by the application. If it does not match, the packet is discarded in block 313. If it does match, the packet is stored in block 314. In both cases, the section filtering concludes at block 315.

If the mode 303 is InRange, for example, block 310 may tell the section filter that the last rule has not been employed, and block 311 will instruct the section filter to obtain the next rule, thereby linking it to another section filter. The result stored in block 309 and the section data is transmitted to this further section filter. Then, for example, block 302 may tell this further section filter that the mode 303 is OutRange, and each bit will be checked accordingly at block 308. This result stored in block 309 is either-ANDed with the previous result and the combined result is passed along accordingly. Block 310 may tell the section filter that the final rule has been employed, and the combined result will be checked at block 312 against the value specified by the application. In this way, range filtering can be accomplished by linking two section filters.

Block 311 can also instruct the section filter to obtain the next rule when employing multiple section filter descriptor rules is desirable for the application. As many section filters may be linked as there are section filter descriptor rules, allowing for multiple filtering of the same data.

Figure 4:
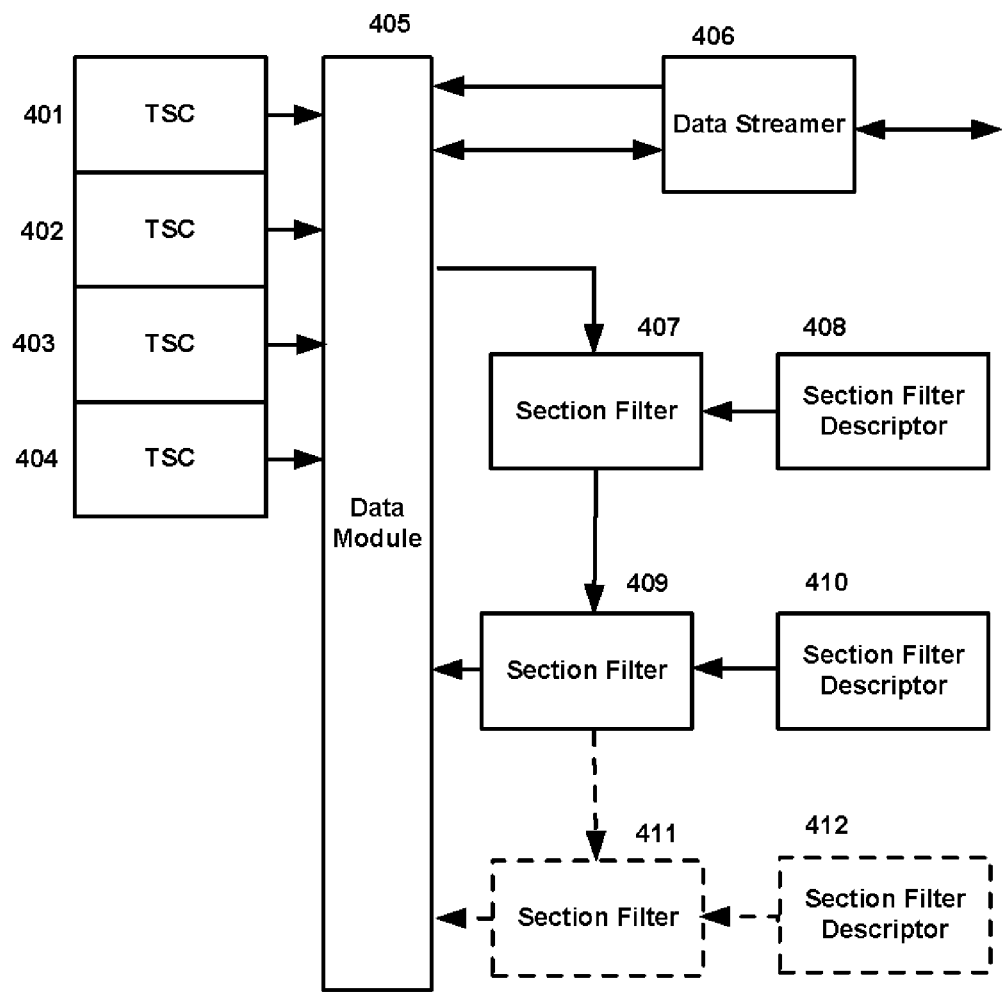
FIG. 4 illustrates an architecture for part of a hardware engine that performs section filtering according to one embodiment of the present invention.

Looking now at an embodiment depicted in FIG. 4, the packets of data to be filtered are sent into TSC (transport stream capture) modules 401-404. TSC modules 401-404 may perform input routing and PID filtering functions similar to those mentioned with respect to FIG. 2, capturing packets as desired by the application. Captured transport packets from TSC modules 401-404 are sent to data module 405. As illustrated in FIG. 4, data module 405 is coupled between TSC modules 401-404 and data streamer 406, and is configured to handle the packets of bitstream data. Input data packets can also be sent to data module 405 through data streamer 406. Section filter 407 reads the data packets from data module 405. Section filter 407 also receives section filter descriptor 408, which may be programmed according to the application being used. Section filter 407 may be constructed with one header and at least one rule. The section filter header and rules are stored in section filter descriptor 408. The section filter header can provide instructions such as to perform a single filtering, to match the PID before performing section filtering, or to point to the next rule, for example. The section filter rules can provide instructions such as Bit Offset (block 301), Match (block 305), No Match (block 306), InRange (block 307), OutRange (block 308), Is Last (block 310), or Get Next Rule (block 311), for example. The data is processed as depicted in FIG. 3, and if the result matches the value specified by the application, the data is sent to data module 405 and written out to desired locations by data streamer 406.

As many additional section filters and section filter descriptors as desired may be added, allowing for multiple filtering of the same data by linking the section filters. If it is desirable to link only two section filters, for example, section filter 407 receives the data packets from data module 405 and the instructions from section filter descriptor 408. Section filter 407 processes the data packets as depicted in FIG. 3. Upon being instructed to get the next rule in block 311, the result stored in block 309 and the data packets are transmitted to section filter 409. Section filter 409 receives instructions from section filter descriptor 410 and processes the data packets as depicted in FIG. 3. Upon being instructed by block 310 that the final rule has been employed, the result from section filter 407 and the result from section filter 409 are checked at block 312 against the value specified by the application. If the results match the value specified by the application, section filter 409 sends the data packets to data module 405, and the data is written out to desired locations by data streamer 406. If the results do not match the value specified by the application, section filter 409 discards the data packets.

Further section filters may be linked as desired. For example, using a third linked section filter is depicted in dashed lines by section filter 411 and section filter descriptor 412. Each section filter transmits the previous results and the data packets to the next section filter until the final rule has been employed, as described above with respect to linking two section filters. The section filter employing the final rule will check all of the results against the value specified by the application, and if the results match, the section filter sends the data packets to data module 405, and the data is written out to desired locations by data streamer 406.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. An apparatus comprising:
    a first section filter, of a plurality of section filters implemented in at least hardware, configured to receive bitstream data and perform a first filtering operation selected from a plurality of filtering operations on said bitstream data to generate a first result, the first filtering operation being selected from a group comprising a match operation, a do not match operation, a within range operation, and a without range operation;
    wherein the first section filter is configured to compare the result to a predetermined value and transmit the result and the bitstream data to a second section filter of the plurality of section filters, wherein the second section filter is distinct from the first section filter and performs a filtering operation selected from the said group; and
    wherein at least one section filter of the plurality of section filters is configured to perform the within range operation or the without range operation.

2. The apparatus of claim 1 wherein the filtering operation begins at any bit location in the bitstream data and ends at any bit location in the bitstream data.

3. The apparatus of claim 1 wherein the first section filter is configured to receive first filter section instructions that specify a bit offset and a selected filtering operation, and begin the selected filtering operation at a bit location corresponding to the bit offset.

4. The apparatus of claim 1, wherein the result is a first result, further wherein the second section filter is configured to:
    receive the first result and the bitstream data from the first section filter,
    perform a second filtering operation on the bitstream data to generate a second result; and
    compare the first result and the second result to the predetermined value or transmit the first result, the second result, and the bitstream data to a further section filter;
    wherein the second filtering operation begins at any bit location in the bitstream data and ends at any bit location in the bitstream data.

5. The apparatus of claim 4 wherein the second section filter is configured to compare the first result and the second result to the predetermined value, and to discard the bitstream data based, at least in part, on the comparison.

6. The apparatus of claim 4 further comprising a data module and wherein the second section filter is configured to compare the first result and the second result to the predetermined value, and transmit the bitstream data to data module based, at least in part, on the comparison.

7. The apparatus of claim 4, further comprising a third section filter configured to:
    receive previously generated results from the first and second section filter and the bitstream data,
    perform a third filtering operation on the bitstream data to generate a third result, the third filtering operation being selected from the group comprising the match operation, the do not match operation, the within range operation, and the without range operation, and
    compare the previously generated results and the third result to the predetermined value or transmit the previously generated results, the third result, and the bitstream data to a fourth section filter.

8. The apparatus of claim 7 wherein the third section filter is configured to compare the previously generated results and the third result to the predetermined value and discard the bitstream data based, at least in part, on the comparison.

9. The apparatus of claim 7 further comprising a data module, wherein the third section filter is configured to compare the previously generated results and the third result to the predetermined value, and transmit the bitstream data to the data module based, at least in part, on the comparison.

10. A method comprising:
    receiving bitstream data;
    performing, by a first section filter of a plurality of section filters, a first filtering operation on the bitstream data, where the first filtering operation generates a first result, the first filtering operation being selected from a group comprising a match operation, a do not match operation, a within range operation, and a without range operation;
    comparing the first result to a predetermined value and transmitting the first result and the bitstream data to a second section filter of the plurality of section filters;
    performing, by the second section filter, a second filtering operation on the bitstream data to generate a second result, the second filtering operation being selected from the said group; and
    wherein at least one of the first and second filtering operations comprises the within range operation or the without range operation.

11. The method of claim 10 wherein the first filtering operation begins at any bit location in the bitstream data and ends at any bit location in the bitstream data.

12. The method of claim 10 further comprising:
    receiving instructions that specify a bit offset and a selected first filtering operation, and beginning the selected first filtering operation at a bit location corresponding to the bit offset.

13. The method of claim 10 further comprising:
    comparing the first result and the second result to the predetermined value or transmitting the first result, the second result, and the bitstream data.

14. The method of claim 10 further comprising comparing the second result to the predetermined value, and discarding the bitstream data based, at least in part, on the comparison.

15. The method of claim 10 further comprising comparing the second result to the predetermined value, and transmitting the bitstream data to a data module based, at least in part, on the comparison.

16. The method of claim 10, further comprising:
  receiving previously generated results and the bitstream data;
  performing a third filtering operation on the bitstream data to generate a third result, the third filtering operation being selected from the group comprising the match operation, the do not match operation, the within range operation, and the without range operation, and comparing the previously generated results and the third result to the predetermined value or transmitting the previously generated results, the third result, and the bitstream data such that a fourth filtering operation is performed on the bitstream data to generate a fourth result,
  wherein the third filtering operation begins at any bit location in the bitstream data and end at any bit location in the bitstream data.

17. The method of claim 16 further comprising comparing the previously generated results and the third result to the predetermined value, and discarding the bitstream data, based, at least in part on, the comparison.

18. The method of claim 16 further comprising comparing the previously generated results and the third result to the predetermined value, and transmitting the bitstream data to a data module, based, at least in part on, the comparison.

* * * * *